(12) United States Patent
Sar Shalom et al.

(10) Patent No.: US 11,170,765 B2
(45) Date of Patent: Nov. 9, 2021

(54) CONTEXTUAL MULTI-CHANNEL SPEECH TO TEXT

(71) Applicant: Intuit Inc., Mountain View, CA (US)

(72) Inventors: Oren Sar Shalom, Nes Ziona (IL); Yair Horesh, Kfar Sava (IL); Alexander Zhicharevich, Hod Hasharon (IL); Elik Sror, Hod Hasharon (IL); Adi Shalev, Herzliya (IL); Yehezkel Shraga Resheff, Jerusalem (IL)

(73) Assignee: Intuit Inc., Mountain View, CA (US)

( * ) Notice: Subject to any disclaimer, the term of this patent is extended or adjusted under 35 U.S.C. 154(b) by 161 days.

(21) Appl. No.: 16/751,867

(22) Filed: Jan. 24, 2020

(65) Prior Publication Data

US 2021/0233520 A1 Jul. 29, 2021

(51) Int. Cl.
| | |
|---|---|
| *G10L 15/187* | (2013.01) |
| *G10L 15/06* | (2013.01) |
| *G10L 15/22* | (2006.01) |
| *H04M 3/50* | (2006.01) |
| *G06N 20/00* | (2019.01) |
| *G10L 15/02* | (2006.01) |

(52) U.S. Cl.
CPC .......... *G10L 15/187* (2013.01); *G06N 20/00* (2019.01); *G10L 15/02* (2013.01); *G10L 15/063* (2013.01); *G10L 15/22* (2013.01); *H04M 3/50* (2013.01); *G10L 2015/025* (2013.01); *H04M 2203/40* (2013.01)

(58) Field of Classification Search
CPC ..... G10L 15/187; G10L 15/02; G10L 15/063; G10L 15/22; G10L 2015/025; G06N 20/00; H04M 3/50; H04M 2203/40
See application file for complete search history.

(56) References Cited

U.S. PATENT DOCUMENTS

| | | | | |
|---|---|---|---|---|
| 6,073,101 | A * | 6/2000 | Maes | G10L 15/065 704/231 |
| 7,826,945 | B2 * | 11/2010 | Zhang | G08G 1/09675 701/36 |
| 9,633,696 | B1 * | 4/2017 | Miller | G11B 27/10 |
| 10,754,925 | B2 * | 8/2020 | D'Souza | G16H 40/20 |
| 2010/0198760 | A1 * | 8/2010 | Maddage | G06F 16/634 706/12 |

(Continued)

*Primary Examiner* — Michael Colucci
(74) *Attorney, Agent, or Firm* — Ferguson Braswell Fraser Kubasta PC

(57) ABSTRACT

A method for improving a transcription may include identifying, in the transcription, reliable channel tokens of an utterance of a reliable channel and an unreliable channel token of an utterance of an unreliable channel, and generating, using a machine learning model, a vector embedding for the unreliable channel token and vector embeddings for the reliable channel tokens. The method may further include calculating vector distances between the vector embedding and the vector embeddings, and generating, for the unreliable channel token and using the vector distances, a score corresponding to a reliable channel token. The method may further include determining that the score is within a threshold score, and in response to determining that the score is within the threshold score, replacing, in the transcription, the unreliable channel token with the reliable channel token.

20 Claims, 8 Drawing Sheets

(56) References Cited

U.S. PATENT DOCUMENTS

| | | | | |
|---|---|---|---|---|
| 2018/0232443 A1* | 8/2018 | Delgo | ................. | G06F 16/35 |
| 2020/0097389 A1* | 3/2020 | Smith | ................. | G06F 11/0775 |
| 2021/0004437 A1* | 1/2021 | Zhang | ................. | G06N 5/04 |

* cited by examiner

CONTEXTUAL MULTI-CHANNEL SPEECH TO TEXT

BACKGROUND

Automated techniques for converting speech to text are often used to support analytics and to provide transcriptions. Configuring a computer to reliably convert speech to text is a difficult problem, and errors are common in the resulting transcriptions. A popular provider of speech to text conversion techniques achieves 90% accuracy per word. Low quality transcription may cause unreliability in search capabilities and other smart tools that utilize the transcribed text.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for improving a transcription including identifying, in the transcription, reliable channel tokens of an utterance of a reliable channel and unreliable channel tokens of an utterance of an unreliable channel, and generating, using a machine learning model, a vector embedding for an unreliable channel token and vector embeddings for the reliable channel tokens. The method further includes calculating vector distances between the vector embedding and the vector embeddings, and generating, for the unreliable channel token and using the vector distances, a score corresponding to a reliable channel token. The method further includes determining that the score is within a threshold score, and in response to determining that the score is within the threshold score, replacing, in the transcription, the unreliable channel token with the reliable channel token.

In general, in one aspect, one or more embodiments relate to a system for improving a transcription including a computer processor, and a repository storing the transcription. The transcription includes reliable channel tokens of an utterance of a reliable channel and unreliable channel tokens of an utterance of an unreliable channel. The system further includes a transcription improver executing on the computer processor and configured to identify, in the transcription, the reliable channel tokens and the unreliable channel tokens, and generate, using a machine learning model, a vector embedding for an unreliable channel token and vector embeddings for the reliable channel tokens. The transcription improver is further configured to calculate vector distances between the vector embedding and the vector embeddings, and generate, for the unreliable channel token and using the vector distances, a score corresponding to a reliable channel token. The transcription improver is further configured to determine that the score is within a threshold score, and in response to determining that the score is within the threshold score, replace, in the transcription, the unreliable channel token with the reliable channel token.

In general, in one aspect, one or more embodiments relate to a method for improving a transcription including identifying, in the transcription, first reliable channel tokens of a preceding utterance of a reliable channel, unreliable channel tokens of an utterance of an unreliable channel, and second reliable channel tokens of a proceeding utterance of a reliable channel, and generating, for an unreliable channel token and using a machine learning model, alternative utterances including alternative tokens. The unreliable channel token corresponds to a score. The method further includes generating, using the machine learning model and for each respective alternative utterance: a consequent probability that the respective alternative utterance follows the preceding utterance of the reliable channel, and a precedent probability that the respective alternative utterance precedes the proceeding utterance of the reliable channel, and selecting, using the consequent probability, the precedent probability, and the score, an alternative utterance as an improvement to the utterance of the unreliable channel.

Other aspects of the invention will be apparent from the following description and the appended claims.

DETAILED DESCRIPTION

Figure 1A:
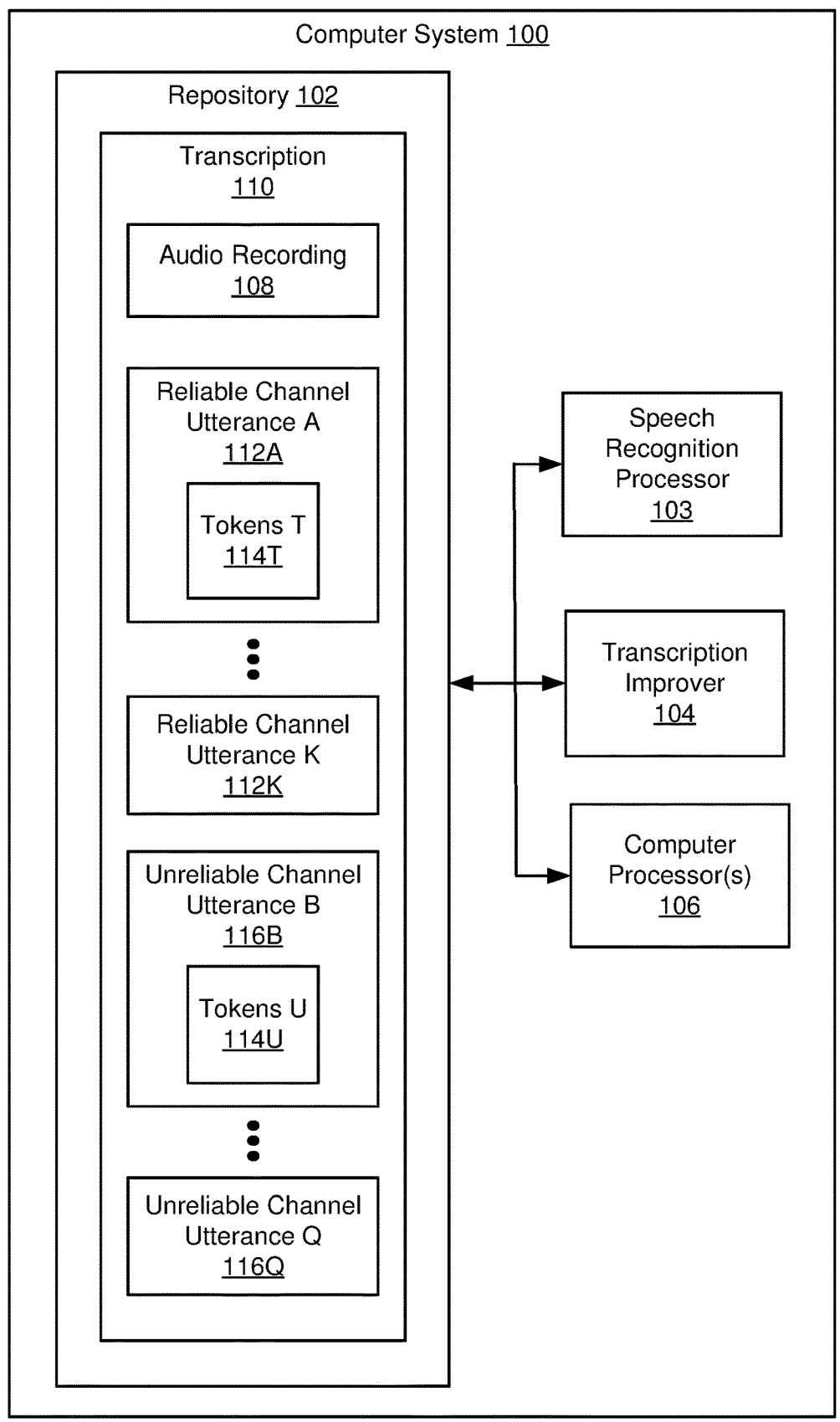
FIG. 1A, FIG. 1B, and FIG. 1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments of the invention are directed to a process for improving a transcription generated, for example, using automated speech to text conversion. The transcription has at least two channels, whereby each channel corresponds to a party in a communication. For example, the communication may be of a meeting, a conference call, a point to point call, or other communication between multiple parties. Each party speaks utterances during the communication, such as complete or incomplete sentences or other audio in the communication. The transcription is a transcription of the utterances. The utterances may vary in their degree of reliability such that utterances of one channel may be more reliably transcribed than utterances of another channel. Specifically, the transcription is of reliable channel utterances interleaved with unreliable channel utterances.

Reliable versus unreliable corresponds to a predefined designation of the level of accuracy of the corresponding channel in the transcription.

By way of an example, in call center interactions between an agent and a customer, the transcription quality of the agent generally exceeds the transcription quality of the customer. For example, the agent may have access to superior communications equipment, and may be trained to speak very clearly, the communication path between the recording device and the agent may be more direct. As such, the agent may be deemed a reliable channel and the customer may be deemed an unreliable channel.

Figure 1B:
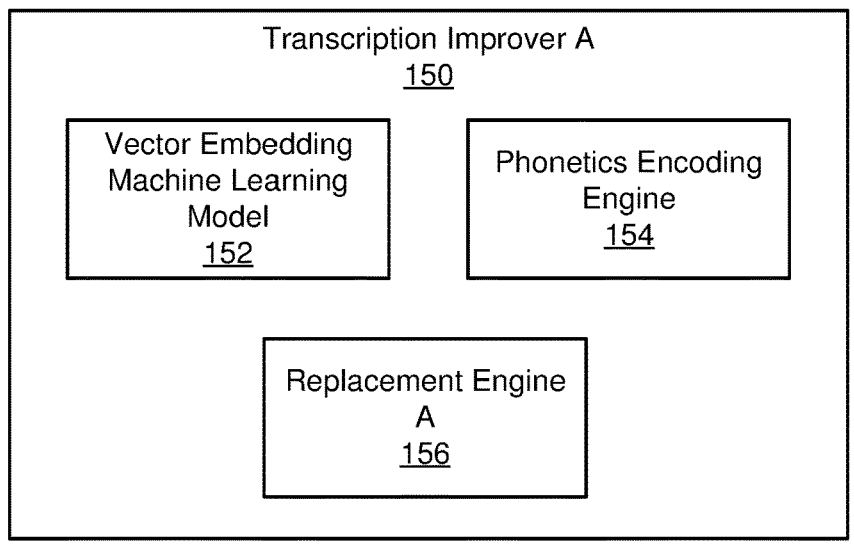
Figure 1B:
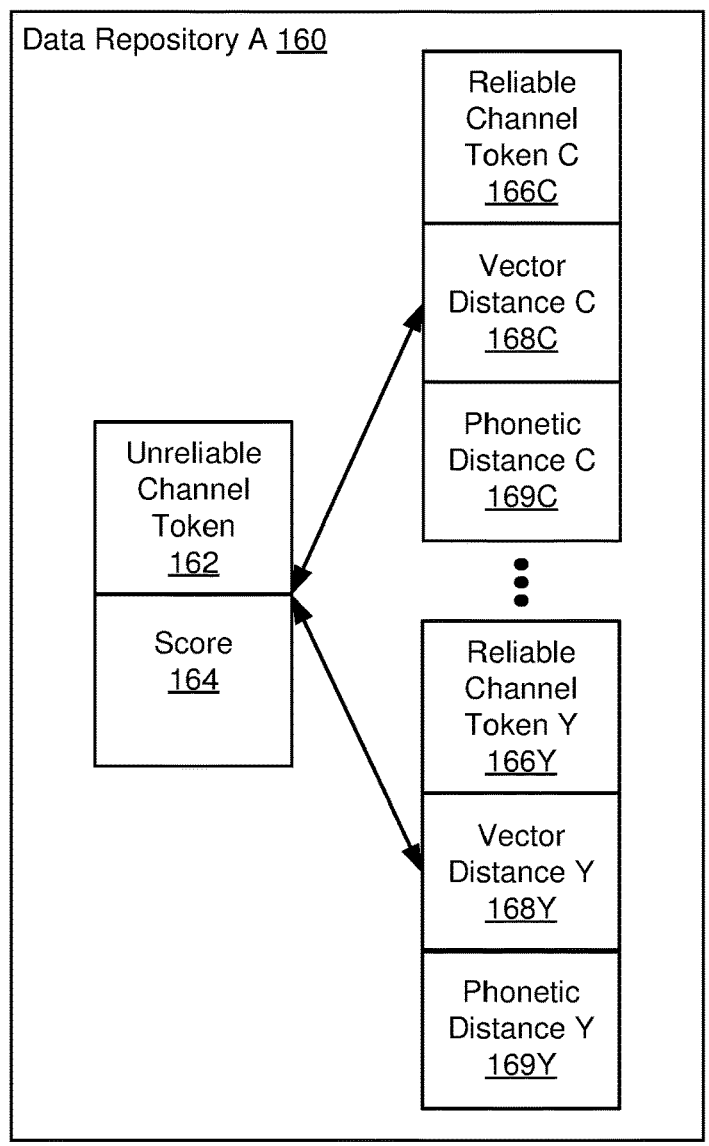
Figure 2A:
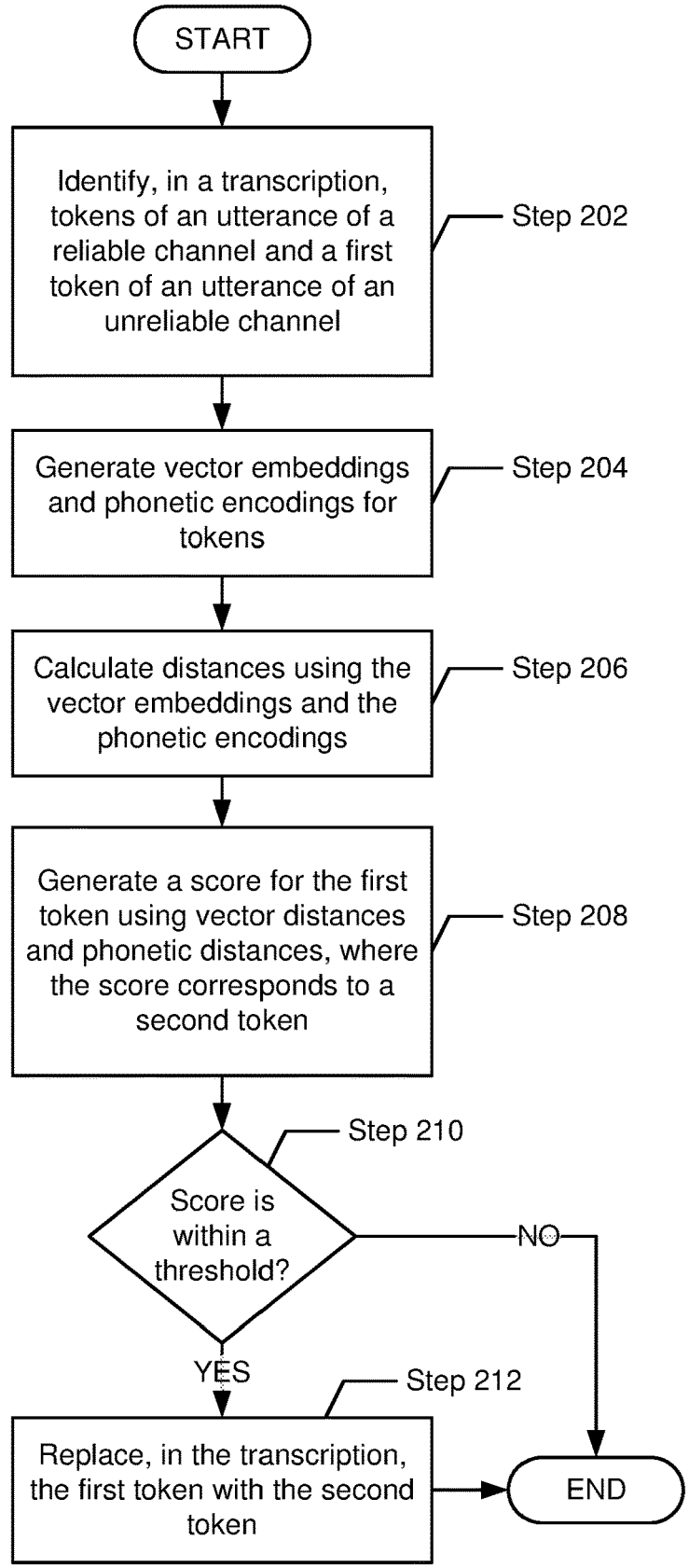
FIG. 2A and FIG. 2B show flowcharts in accordance with one or more embodiments of the invention.
Figure 3:
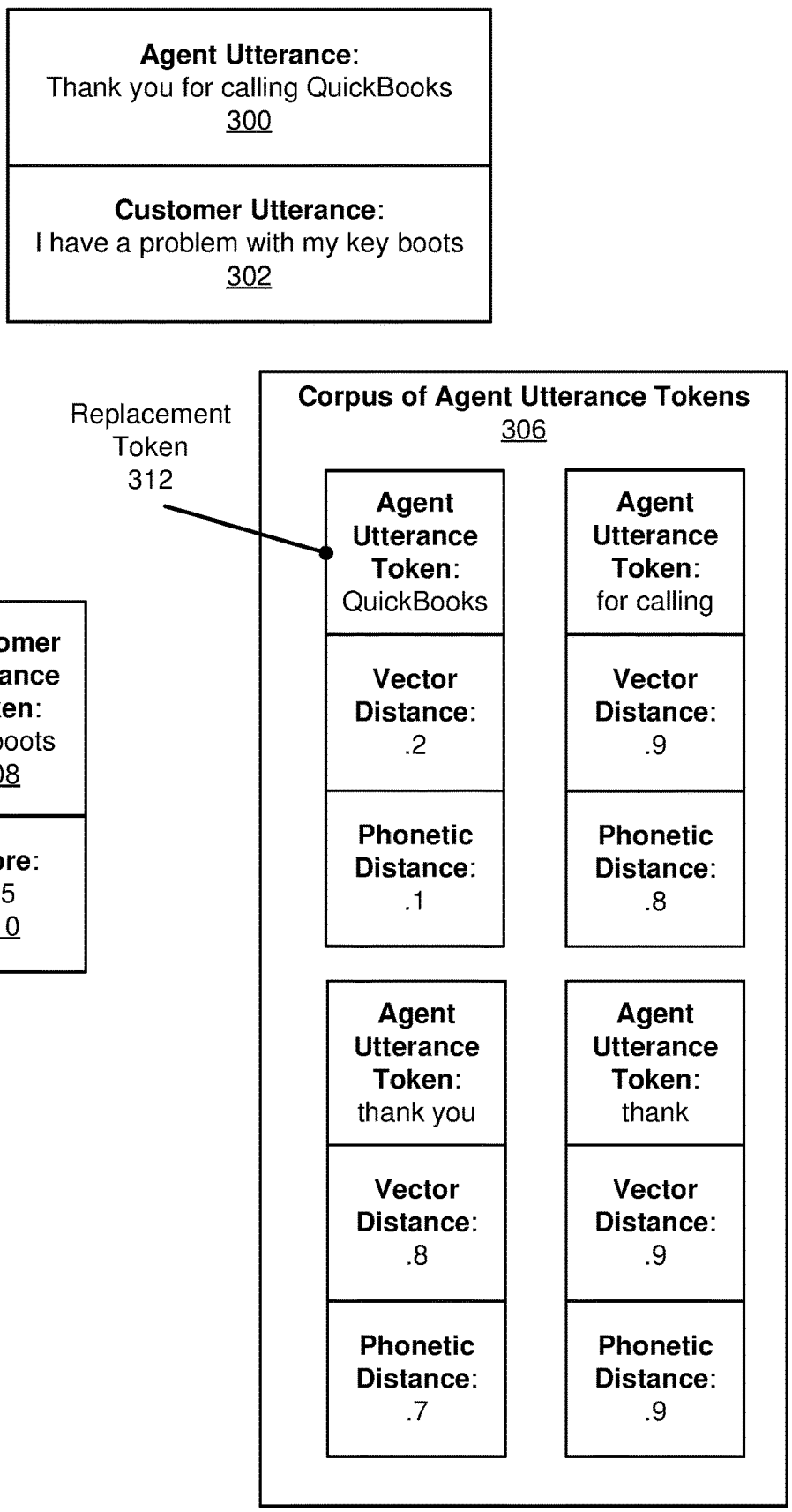
FIG. 3 and FIG. 4 show examples in accordance with one or more embodiments of the invention.

In general, embodiments leverage the reliability of the transcription of the reliable channel utterances to improve the transcription of the unreliable channel. A brief overview of the technique is presented as follows. The full description is presented with reference to the accompanying Figures below. By way of a brief overview, the technique may identify, in the transcription, reliable channel tokens of an utterance of the reliable channel and unreliable channel tokens of an utterance of the unreliable channel. The technique may generate vector embeddings and phonetic encodings, using a machine learning model, for an unreliable channel token and the reliable channel tokens. For example, the vector embeddings may be word2vec embeddings, and the phonetic encodings may be based on the New York State Identification and Intelligence System (NYSIIS) phonetic coding algorithm. The technique may then calculate vector distances between the vector embedding for the unreliable channel token and the vector embeddings for the reliable channel tokens. Similarly, phonetic distances between the phonetic encoding for the unreliable channel token and the phonetic encodings for the reliable channel tokens may be calculated. A score may then be calculated for the unreliable channel token, using the vector distances and the phonetic distances. The score may correspond to a specific reliable channel token that is most similar to the unreliable channel token, based on an aggregate distance that combines the vector distances and the phonetic distances. In other words, the specific reliable channel token may be similar to the unreliable channel token, both contextually and phonetically. In the Figures, FIG. 1A shows a general system. FIGS. 1B, 2A, and 3 correspond to this first embodiment.

Figure 1C:
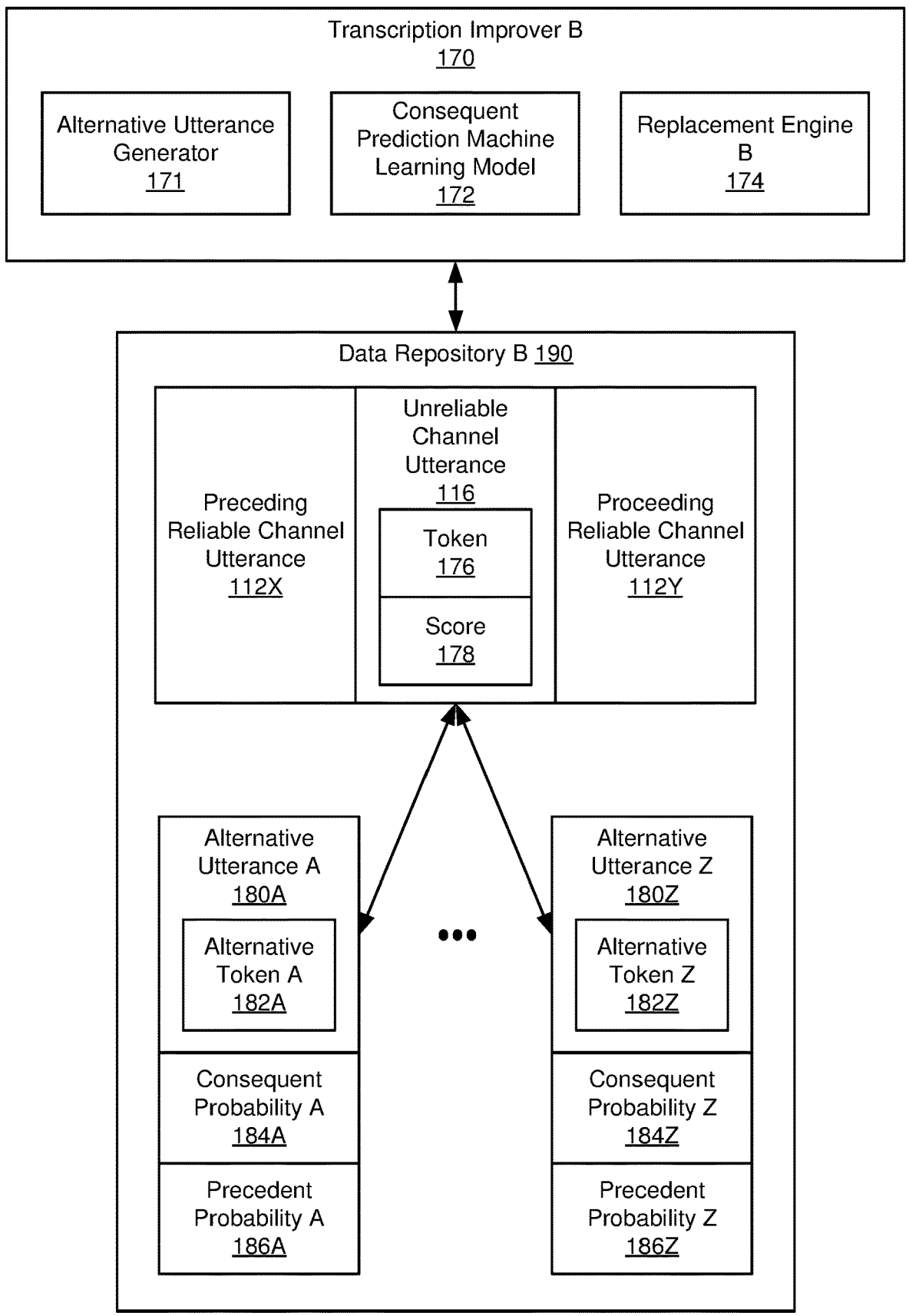
Figure 2B:
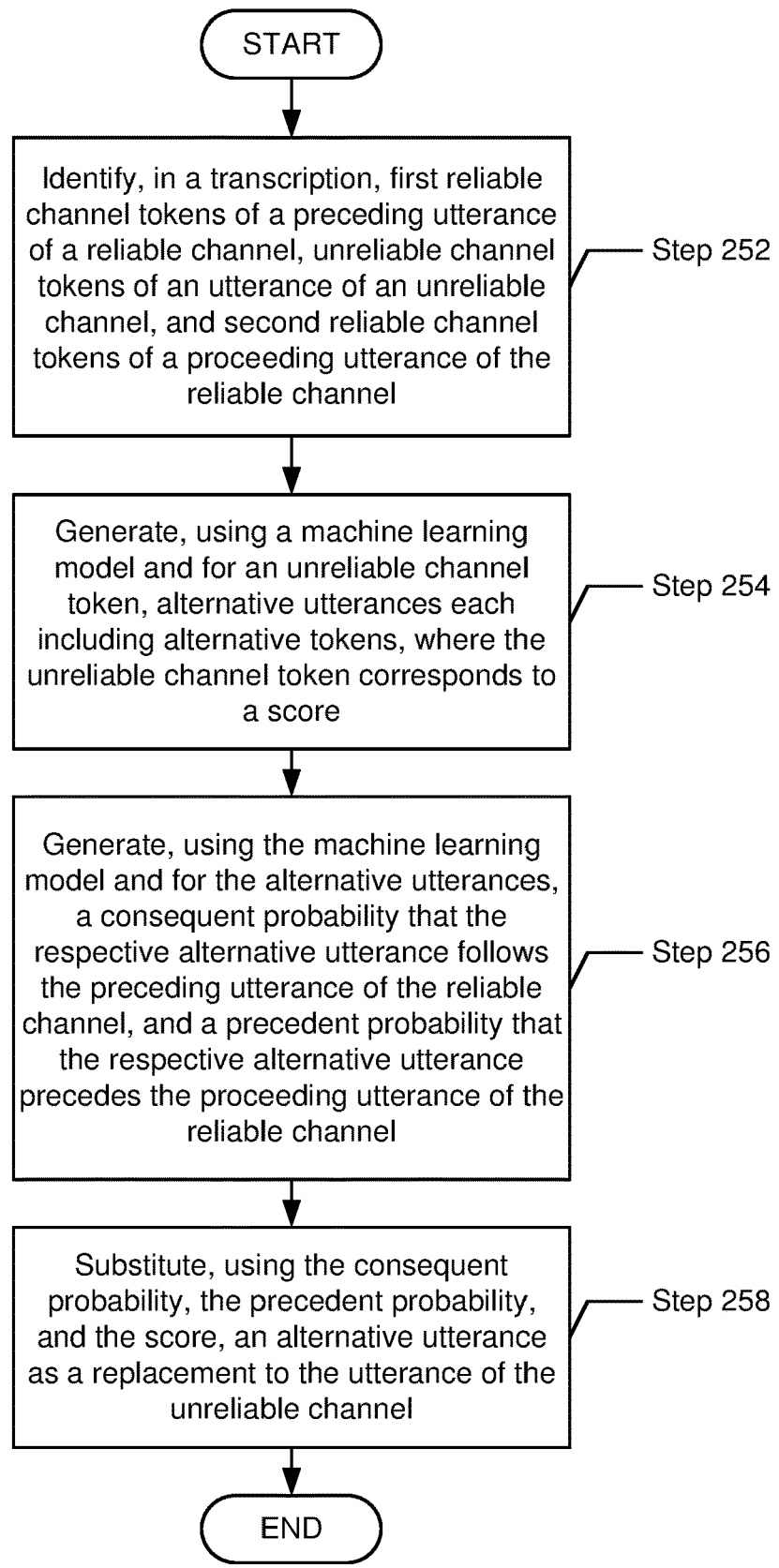
Figure 4:
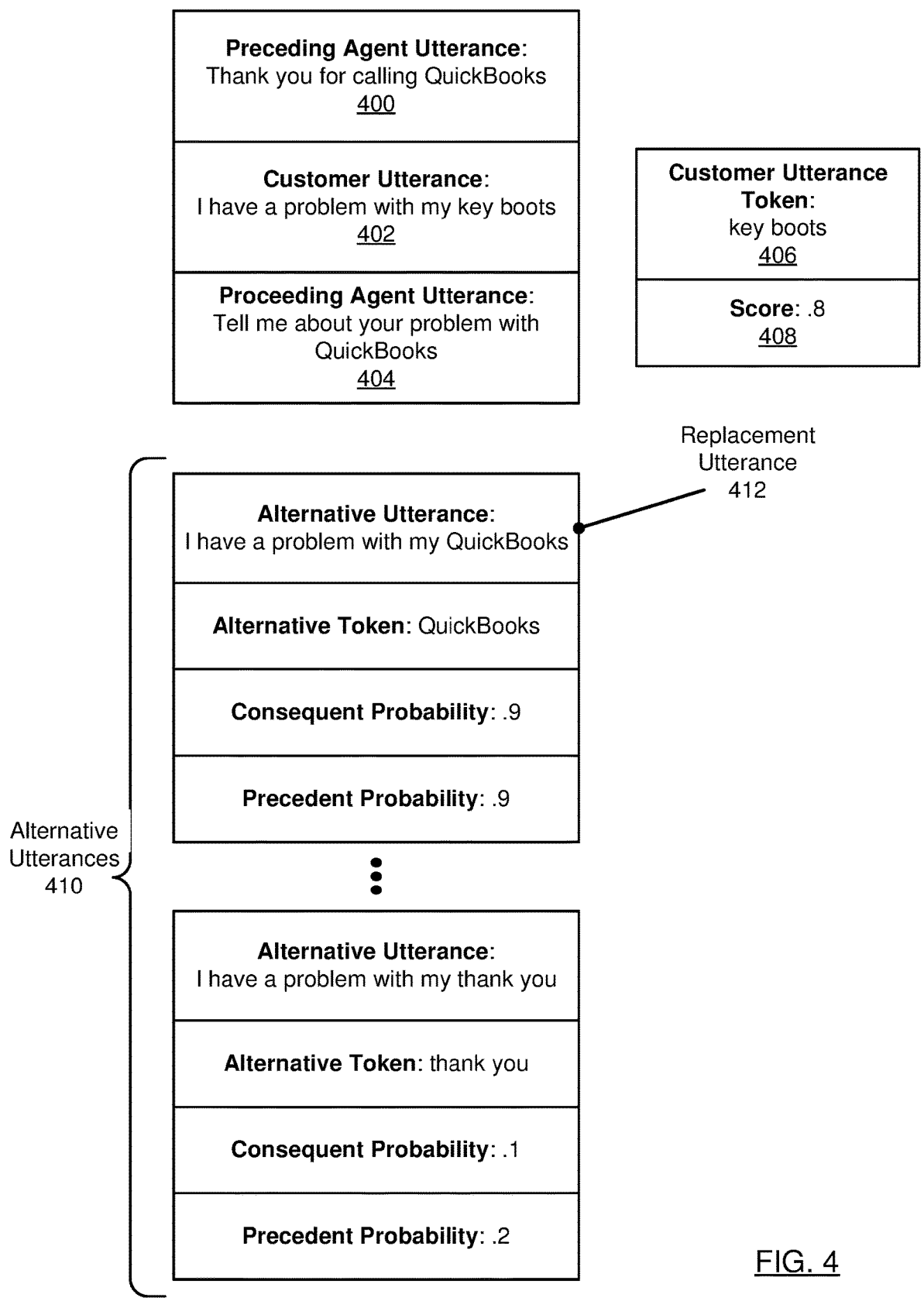

In another embodiment, alternative utterances are generated for unreliable channel tokens, using a machine learning model. The alternative utterances may include possible ways to replace one or more tokens of the utterance of the unreliable channel with alternative tokens. The unreliable channel token may correspond to a score that represents a probability that the unreliable channel token has been transcribed incorrectly from an audio recording. In one or more embodiments, the unreliable channel utterance is interposed between two reliable channel utterances, called a preceding utterance and a proceeding utterance. A consequent probability that each alternative utterance follows the preceding utterance and a precedent probability that the alternative utterance precedes the proceeding utterance may be generated using the machine learning model. The consequent probability and the precedent probability may be viewed as contextual probabilities that the alternative token(s) included in the each alternative utterance represent an accurate replacement for the corresponding token(s) of the utterance of the unreliable channel. In one or more embodiments, an alternative utterance is substituted as an improvement to the utterance of the unreliable channel by combining the consequent probability, the precedent probability, and the score into a confidence level that the alternative token(s) included in the alternative utterance represent an accurate replacement for the corresponding token(s) of the utterance of the unreliable channel. When at least one alternative utterance has a confidence level exceeding a threshold confidence level, the alternative utterance corresponding to the highest confidence level is substituted as an improvement to the utterance of the unreliable channel in the transcription. FIGS. 1C, 2B, and 4 correspond to this second embodiment.

The following is a more detailed description of embodiments disclosed herein with reference to the accompanying Figures.

FIG. 1A shows a computer system (100) in accordance with one or more embodiments of the invention. As shown in FIG. 1A, the computer system (100) includes a repository (102), a speech recognition processor (103), a transcription improver (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes an audio recording (108) and a transcription (110). The audio recording (108) may be a record of audio communications among two or more channels. For example, the audio recording (108) may be an analog recording or a digital recording. A channel may be a source of communication. For example, the communication may be between a customer channel and a call center agent channel. As another example, a channel may be an automated communication source such as a speech synthesizer. As another example, the channel may correspond to a party to a conference call. A transcription (110) may be a textual record of communications among two or more channels. The speech recognition processor (103) may include functionality to generate a transcription (110) from an audio recording (108).

In one or more embodiments, the transcription (110) includes reliable channel utterances (112A, 112K) and unreliable channel utterances (116B, 116Q). An utterance may be a unit of communication received from a channel. The unit of communication may be uninterrupted by an utterance of another channel. In one or more embodiments, an utterance may be divided into a set of tokens (e.g., (114T), (114U)) received from a single channel. Each token (e.g., (114T), (114U)) may be an alphanumeric string. For example, a token may include a single term, multiple terms, numerical expression, etc. Two tokens in the set of tokens may have common terms from the utterance. For example, the utterance: "How do I access my contacts" has tokens "How", "How do", "How do I", "How do I access", "do", "do I", "do I access", "do I access my", "I", "I access", "I access my", "I access my contacts", "access", and so forth. While the above example shows a maximum of four terms in a token, more or fewer maximum terms may exist.

A reliability metric defines the level of accuracy of transcribing a channel. For example, the value of the reliability metric may be calculated from feedback regarding the accuracy of transcribing the terms in the utterances received from the channel. Continuing this example, the feedback may be received from the channel, from an observer (e.g., listener) of the utterance, or from another reviewer. A reliable channel is a channel whose corresponding reliability metric value exceeds a reliability threshold. Conversely, an unreliable channel is a channel whose corresponding reliability metric value exceeds an unreliability threshold. The unreliability threshold may be the same value or different values. For example, the reliability threshold may be a value that is greater than the unreliability threshold. In the example, when the reliability metric is between the reliability threshold and the unreliability threshold, the corresponding channel may be deemed neither reliable nor unreliable. Rather than using a reliability metric and reliability/unreliability threshold(s), the reliable channel and unreliable channel may be designated as such using a flag by a human. Thus, the terms "reliable" and "unreliable" refer to a human or automated designation as to the level of accuracy of the transcription of the channel.

In one or more embodiments, the transcription improver (104) may be implemented in hardware (e.g., circuitry), software, firmware, and/or any combination thereof. The transcription improver (104) may include functionality to identify tokens (e.g., (114T), (114U)) in an utterance (e.g., (112A, 112K, 116B, 116Q)). For example, the transcription improver (104) may use a variety of techniques identify tokens in an utterance, including: named entity recognition (NER), rule-based techniques, statistics-based techniques, classification techniques (e.g., Naïve Bayes classification), etc.

Turning to FIG. 1B, the transcription improver (150) may include a vector embedding machine learning model (152), a phonetics encoding engine (154), and a replacement engine (156). The vector embedding machine learning model (152) may include functionality to map a token to a vector embedding (e.g., a point) that represents the token in a multi-dimensional semantic space. For example, the vector embedding machine learning model (152) may map a token to a word2vec embedding. The value assigned to each dimension of a vector embedding corresponding to a token may be based on the co-occurrence of the token with another token within a context window in a training corpus. In other words, tokens that are contextually similar have similar vector embeddings, while tokens that are contextually unrelated have different vector embeddings.

The vector embedding machine learning model (152) may include functionality to calculate vector distances (168C, 168Y) between an unreliable channel token (162) and reliable channel tokens (166C, 166Y). The vector distances (168C, 168Y) are a measure of contextual similarity between the unreliable channel token (162) and the reliable channel tokens (166C, 166Y). In one or more embodiments, the vector embedding machine learning model (152) calculates the vector distances (168C, 168Y) using the vector embeddings corresponding to the unreliable channel token (162) and reliable channel tokens (166C, 166Y). For example, tokens that appear in similar contexts (e.g., the tokens "dolphin", "porpoise", and "Sea World") may correspond to vector embeddings that are near each other in the multi-dimensional semantic space. The vector embedding machine learning model (152) may calculate the vector distances (168C, 168Y) using the cosine similarity between the vector embeddings.

The vector embedding may be formed using various cluster analysis techniques (e.g., k-means clustering, centroid-based clustering, hierarchical clustering, distribution-based clustering, density-based clustering, etc.). The vector embeddings may be learned during the training phase of the vector embedding machine learning model (152). The vector embedding machine learning model (152) may be trained using a training corpus of reliable channel utterances (112A, 112K) of multiple reliable channels. Further, the training corpus used to train the vector embedding machine learning model (152) may exclude unreliable channel utterances (116B, 116Q).

The phonetics encoding engine (154) may include functionality to calculate phonetic distances (169C, 169Y) between an unreliable channel token (162) and reliable channel tokens (166C, 166Y). The phonetic distances (169C, 169Y) are a measure of phonetic similarity between the unreliable channel token (162) and the reliable channel tokens (166C, 166Y). In other words, the phonetic distances is a measure of the similarity in sound between two tokens. For example, "your door birds" is phonetically similar to "for your words" based on similar sounds.

The phonetics encoding engine (154) may include functionality to map a token to a phonetic encoding of the token. For example, the phonetics encoding engine (154) may map a token to a phonetic encoding of the token using the New York State Identification and Intelligence System (NYSIIS) phonetic coding algorithm. Tokens that sound alike may be encoded similarly in the phonetic encoding. For example, the NYSIIS phonetic coding algorithm may change the letter sequence "ph" to the letter sequence "ff". In one or more embodiments, the phonetics encoding engine (154) calculates the phonetic distances (169C, 169Y) using the phonetic encodings corresponding to the unreliable channel token (162) and reliable channel tokens (166C, 166Y). For example, the phonetic distances (169C, 169Y) may be based on the edit distance between the phonetic encodings.

The vector embedding machine learning model (152) may include functionality to generate a score (164) for an unreliable channel token (162) using vector distances (168C, 168Y) and/or phonetic distances (169C, 169Y) corresponding to one or more reliable channel tokens (166C, 166Y). In one or more embodiments, the score (164) is an aggregate distance based on a weighted combination of a vector distance (168C) between the unreliable channel token (162) and a reliable channel token (166C) and a phonetic distance (169C) between the unreliable channel token (162) and the reliable channel token (166C). For example, the score (164) may be the minimum such aggregate distance corresponding to the unreliable channel token (162) and a reliable channel token (166C). The weights applied to the vector distance (168C) and the phonetic distance (169C) may be hyperparameters of the vector embedding machine learning model (152). Alternatively, the weights applied to the vector distance (168C) and the phonetic distance (169C) may be learned during the training of the vector embedding machine learning model (152).

The unreliable channel token (162), reliable channel tokens (166C, 166Y), vector distances (168C, 168Y) and phonetic distances (169C, 169Y) may be stored in the data repository (160). For example, the data repository (160) may be temporary, or semi-permanent storage of data.

The replacement engine (156) may include functionality to replace, in a transcription (110), an unreliable channel token (162) with a reliable channel token (166C).

FIG. 1C shows a schematic diagram of a system in which the transcription improver uses preceding and succeeding reliable channel utterances. Turning to FIG. 1C, the transcription improver (170) may include an alternative utterance generator (171), a consequent prediction machine learning model (172) and a replacement engine (174). The alternative utterance generator (171) includes functionality to generate alternative utterances (180A, 180Z) for an unreliable channel utterance (116). In one or more embodiments, the unreliable channel utterance (116) follows, in the transcript (110), a preceding reliable channel utterance (112X), and the unreliable channel utterance (116) precedes, in the transcript (110), a proceeding reliable channel utterance (112Y). In other words, the unreliable channel utterance (116) (e.g., an utterance of a customer) is interposed between two reliable channel utterances (112X, 112Y) (e.g., utterances of a call center agent). The various utterances (e.g., 112X, 112Y, 116, 180A, 180Z, etc.) may be stored in a data repository (190).

Tokens (e.g., token (176)) in the unreliable channel utterance have a corresponding score (178). The score (178) is a probability that the token (176) has been transcribed incorrectly from the audio recording (108).

The alternative utterances (180A, 180Z) are alternatives of the unreliable utterance. Specifically, the alternative channel utterances (180A, 180Z) are possible improvements of the unreliable channel utterance. The alternative utterances (180A, 180Z) may include alternative tokens (182A, 182Z) that each represent a possible improvement of a particular token (e.g., token (176)) of the unreliable channel utterance (116).

The consequent prediction machine learning model (172) includes functionality to generate consequent probabilities (184A, 184Z) corresponding to the alternative utterances (180A, 180Z). A consequent probability (184A) is a probability that the corresponding alternative utterance (180A) is a consequent of (e.g., follows) the preceding reliable channel utterance (112X). Similarly, the consequent prediction machine learning model (172) may include functionality to generate precedent probabilities (186A, 186Z) corresponding to the alternative utterances (180A, 180Z). A precedent probability (186A) is a probability that the corresponding alternative utterance (180A) is a precedent of (e.g., precedes) the proceeding reliable channel utterance (112Y).

By way of an example, consider the scenario in which a first person says, "Move the cursor to the top left corner of the screen." Then the second person talks. Then the first person says, "Now select the file menu option." Both the consequent probability and the precedent probability are higher for an alternative of "Okay, I have moved the cursor" than "Okay, I have disproved the bursar" because "Okay, I have moved the cursor" is more likely to follow "Move the cursor to the top left corner of the screen" and is more likely to precede "Now select the file menu option."

The consequent prediction machine learning model (172) may be the same model to determine the consequent and precedent probabilities. Stated another way, the precedent probability that an alternative utterance precedes the proceeding reliable channel utterance is a same probability as that the probability that the proceeding reliable channel utterance is a consequent of the alternative utterance. Conversely, the consequent probability that an alternative utterance is a consequent of the preceding reliable channel utterance is a same probability as that the probability that the preceding reliable channel utterance precedes the alternative utterance. As such, the use of the terms consequent probability and preceding probability is with respect to the location of the alternative utterance to the reliable utterance that is being compared.

The consequent prediction machine learning model (172) may be a pre-trained word embedding model for natural text understanding trained using pairs of utterances, where the machine learning model (172) learns to predict whether an utterance in a pair is a consequent of the other utterance in the pair, or whether the two utterances are apart from each other. For example, two utterances are apart from each other when the two utterances are taken from different documents, or are located far apart within the same document. Examples of such pre-trained models include: Embeddings from Language Models (Elmo), Bidirectional Encoder Representations from Transformers (BERT), Robustly Optimized BERT Pretraining Approach (roBERTa), XLNet, Ernie, Ernie 2.0, etc.

In one or more embodiments, the consequent prediction capability of the consequent prediction machine learning model (172) is based on generating multiple alternative vector embeddings for a token, where the multiple alternative vector embeddings correspond to multiple alternative contexts in which the token may be used. For example, the consequent prediction machine learning model (172) may map the token "apple" to both a first vector embedding corresponding to a first context relating to eating an apple, and a second vector embedding corresponding to a second context relating to purchasing a device from an Apple computer store.

The replacement engine (174) may include functionality to replace, in a transcription (110), an unreliable channel utterance (116) with an alternative utterance (180A). In one or more embodiments, the computer processor (106) includes functionality to execute the speech recognition processor (103) and/or the transcription improver (104).

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

The following are flowcharts for a computer system to improve transcripts. Prior to improving a transcript, an audio recording of a communication between at least two channels is generated and stored, temporarily or permanently, in whole or in part. A natural language processor in conjunction with a speech to text converter convert the audio recording to text maintaining which channel communicates which utterance. At least one channel is designated (e.g., automatically) as a reliable channel based on reliability metrics and/or human assumptions. The reliable and unreliable channels may have a corresponding flag stored indicating the reliability or may be preconfigured within the software.

FIG. 2A shows a flowchart in accordance with one or more embodiments of the invention. The flowchart depicts a process for improving a transcription. One or more of the steps in FIG. 2A may be performed by the components (e.g., the transcription improver (104) of the computer system (100)), discussed above in reference to FIGS. 1A and 1B. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

An unreliable channel token may be selected for improvement. In some embodiments, the system iterates through each unreliable channel token in the transcript. In other embodiments, only a subset of unreliable channel tokens are selected for improvement. The selected subset may be based on a score assigned by the speech to text converter as to the likelihood that the token is incorrectly transcribed. Steps 202-212 describe a technique for improving a particular unreliable channel token.

Initially, in Step 202, reliable channel tokens of an utterance of a reliable channel and an unreliable channel token of an utterance of an unreliable channel are identified in a transcription. In one or more embodiments, the transcription improver identifies the reliable channel tokens in multiple utterances of the reliable channel in the transcription. For example, the transcription improver may identify the reliable channel tokens in: 1) an utterance of the reliable channel that precedes the utterance of the unreliable channel in the transcription, and 2) an utterance of the reliable channel that follows the utterance of the unreliable channel in the transcription.

In Step 204, vector embeddings and phonetic encodings are generated for an unreliable channel token and the reliable channel tokens, using a machine learning model. The machine learning model may generate a vector embedding for the unreliable channel token, and may generate vector embeddings for the reliable channel tokens. A phonetic encoding engine may generate a phonetic encoding for the unreliable channel token and may generate phonetic encodings for the reliable channel tokens.

In Step 206, vector distances between the vector embedding for the unreliable channel token and the vector embeddings for the reliable channel tokens are calculated. For example, the transcription improver may calculate the vector distances based on the cosine similarity between the vector embeddings. In addition, the transcription improver may calculate phonetic distances between the phonetic encoding for the unreliable channel token and the phonetic encodings for the reliable channel tokens. For example, the transcription improver may calculate the phonetic distances based on the edit distance between the phonetic encodings.

In Step 208, a score is calculated for the unreliable channel token, using the vector distances and the phonetic distances. The score may correspond to a specific reliable channel token. For example, the score may correspond to the reliable channel token that is most similar to the unreliable channel token, based on an aggregate distance that combines the vector distances and the phonetic distances. Continuing this example, the score may be the minimum aggregate distance corresponding to the unreliable channel token and a reliable channel token.

For example, the score may be calculated using the equation score(unreliableToken)=min(w1*f1(vector distance of reliable token to unreliable token)+w2*f2(phonetic distance of reliable token to unreliable token)), where the minimum is across the reliable channel tokens in the preceding and succeeding utterances. In the equation, w1 and w2 are learned weights, and f1 and f2 are functions.

If, in Step 210, it is determined, that the score is within a threshold score, then in Step 212, the unreliable channel token is replaced with the reliable channel token in the transcription. For example, a low score (e.g., a small aggregate distance) may indicate that the unreliable channel token is very similar to a reliable channel token both contextually and phonetically. In one or more embodiments, when multiple reliable channel tokens correspond to the same aggregate distance from the unreliable channel token, the transcription improver may replace the unreliable channel token with the reliable channel token having the largest number of words. For example, the transcription improver may favor, as a replacement, a reliable channel token that is a bigram over a reliable channel token that is a unigram.

FIG. 2B shows a flowchart in accordance with one or more embodiments of the invention. The flowchart depicts a process for improving a transcription using the consequent predictor machine learning model described in FIG. 1C. One or more of the steps in FIG. 2B may be performed by the components (e.g., the transcription improver (104) of the computer system (100)), discussed above in reference to FIGS. 1A and 1C. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, first reliable channel tokens of a preceding utterance of a reliable channel, unreliable channel tokens of an utterance of an unreliable channel, and second reliable channel tokens of a proceeding utterance of the reliable channel are identified in a transcription (see description of Step 202 above).

In Step 254, alternative utterances including alternative tokens are generated for an unreliable channel token, using a machine learning model. For example, the alternative utterances may include all of the possible ways to replace a token of the utterance of the unreliable channel with an alternative token. In one or more embodiments, alternative utterances including alternative tokens are generated for multiple unreliable channel tokens. For example, the alternative utterances may correspond to the Cartesian product of the unreliable channel tokens. Continuing this example, the alternative utterances may include the possible ways to replace one token of the utterance of the unreliable channel with an alternative token, the possible ways to replace two tokens of the utterance of the unreliable channel with alternative tokens, the possible ways to replace three tokens of the utterance of the unreliable channel with alternative tokens, and so on.

The unreliable channel token may correspond to a score. For example, the score may be a probability that the unreliable channel token has been transcribed incorrectly from an audio recording. Continuing this example, the score may be assigned by a speech recognition processor or by the transcription improver.

In Step 256, a consequent probability that each alternative utterance follows the preceding utterance of the reliable channel and a precedent probability that the alternative utterance precedes the proceeding utterance of the reliable channel are generated using the machine learning model. The consequent probability and the precedent probability may be viewed as contextual probabilities that the alternative token(s) included in the alternative utterance represent an accurate replacement for the corresponding token(s) of the utterance of the unreliable channel.

In Step 258, an alternative utterance is selected as an improvement to the utterance of the unreliable channel using the consequent probability, the precedent probability, and the score. In one or more embodiments, the consequent probability, the precedent probability, and the score corresponding to each alternative utterance are multiplied together to obtain a confidence level that the alternative token(s) included in the alternative utterance represent an accurate replacement for the corresponding token(s) of the utterance of the unreliable channel. When at least one alternative utterance has a confidence level exceeding a threshold confidence level, the transcription improver may select, as an improvement to the utterance of the unreliable channel in the transcription, the alternative utterance corresponding to the highest confidence level. Otherwise, if no alternative utterance has a confidence level exceeding a threshold confidence level, the transcription improver does not replace the utterance of the unreliable channel in the transcription.

The following example is for explanatory purposes only and not intended to limit the scope of the invention. FIG. 3 and FIG. 4 show implementation examples in accordance with one or more embodiments of the invention. FIG. 3 shows an agent utterance (300) ((112A) in FIG. 1A) and a customer utterance (302) ((116B) in FIG. 1A). The transcription improver identifies, in a transcription, a corpus of agent utterance tokens (306) ((114T) in FIG. 1A and (166C, 166Y) in FIG. 1B) and a corpus of customer utterance tokens that includes a customer utterance token "key boots" (308) ((114U) in FIG. 1A and (162) in FIG. 1B).

The vector embedding machine learning model calculates vector distances as measures of contextual similarity between the customer utterance token "key boots" (308) and the agent utterance tokens (306). The phonetics encoding engine calculates phonetic distances as measures of phonetic similarity between the customer utterance token "key boots" (308) and the agent utterance tokens (306). Then, the transcription improver combines the vector distances and the phonetic distances into aggregate distances. In this case, the aggregate distance equally weights the vector distances and the phonetic distances. The replacement engine selects the agent utterance token with the lowest aggregate distance as a replacement token for the customer utterance token "key boots" (308), if the lowest aggregate distance is within a minimum threshold of 0.2. In this case, the lowest aggregate distance is the aggregate distance of 0.15 between the agent utterance token "QuickBooks" and the customer utterance token "key boots" (308). Thus, the transcription improver assigns the score (310) ((164) in FIG. 1B) as the aggregate distance between the agent utterance token "QuickBooks" and the customer utterance token "key boots" (308). The replacement engine then selects the agent utterance token "QuickBooks" as the replacement token (312), since the lowest aggregate distance is within the minimum threshold of 0.2.

FIG. 4 shows a preceding agent utterance (400) ((112X) in FIG. 1C), a customer utterance (402) ((116) in FIG. 1C), and a proceeding agent utterance (404) ((112Y) in FIG. 1C). The consequent prediction machine learning model generates alternative utterances (410) ((180A, 180Z) in FIG. 1C) each including an alternative token for the customer utterance token "key boots" (406) ((176) in FIG. 1C). The customer utterance token "key boots" (406) corresponds to a score (408) ((178) in FIG. 1C) that represents the probability that the customer utterance token "key boots" (406) has been transcribed incorrectly from an audio recording.

The consequent prediction machine learning model then generates, for each of the alternative utterances (410), a consequent probability that the alternative utterance follows the preceding agent utterance (400), and a precedent probability that the alternative utterance precedes the proceeding agent utterance (404). The replacement engine multiplies the consequent probability, the precedent probability, and the score (408) to obtain a confidence level that the alternative token included in the alternative utterance represents an accurate replacement for the customer utterance token "key boots" (406). The replacement engine selects the alternative utterance with the highest confidence level as an improvement to the customer utterance (402), if the highest confidence level exceeds a threshold of 0.6. In this case, the replacement engine selects the alternative utterance "I have a problem with my QuickBooks" as a replacement utterance (412), which corresponds to the highest confidence level of 0.68, which exceeds the threshold of 0.6.

Figure 5A:
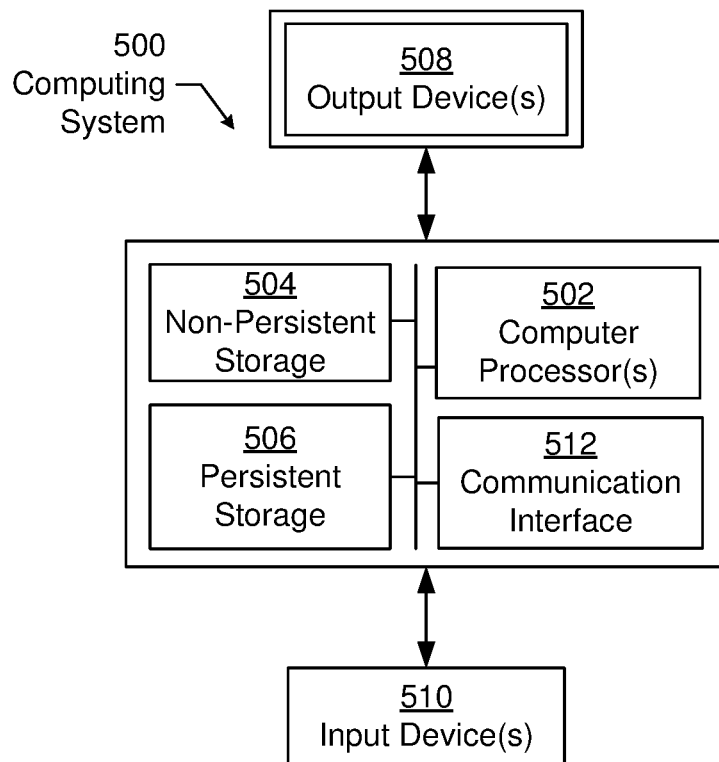
FIG. 5A and FIG. 5B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
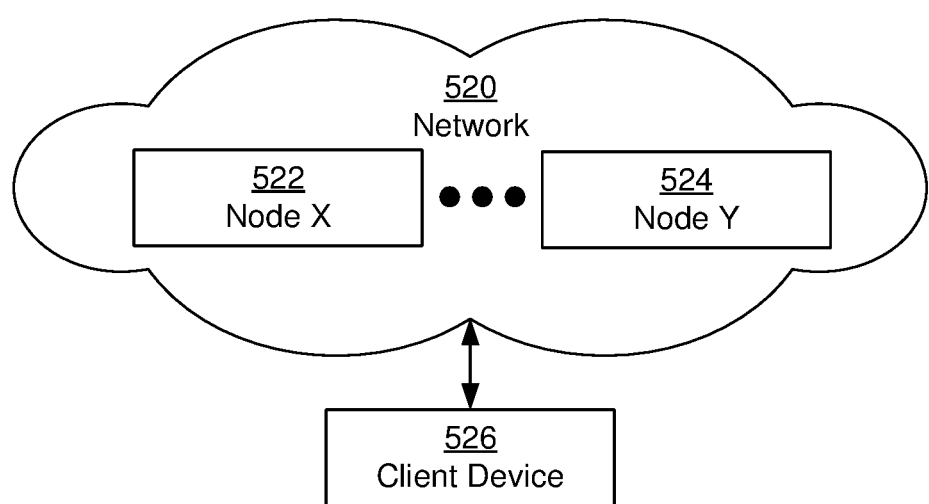

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for improving a transcription, comprising:
   identifying, in the transcription, a first plurality of tokens of a first utterance of a reliable channel and a first token of an utterance of an unreliable channel;
   generating, using a machine learning model, a first vector embedding for the first token and a first plurality of vector embeddings for the first plurality of tokens;
   calculating a plurality of vector distances between the first vector embedding and the first plurality of vector embeddings;
   generating, for the first token and using the plurality of vector distances, a score corresponding to a second token of the first plurality of tokens;
   determining that the score is within a threshold score; and
   in response to determining that the score is within the threshold score, replacing, in the transcription, the first token with the second token.

2. The method of claim 1, wherein the reliable channel corresponds to a value of a reliability metric that exceeds a reliability threshold, and wherein the unreliable channel corresponds to a value of an unreliability metric that exceeds an unreliability threshold.

3. The method of claim 1, further comprising:
   generating a first phonetic encoding of the first token and a second phonetic encoding of the second token;
   calculating an encoding distance between the first phonetic encoding and the second phonetic encoding,
   wherein the generation of the score is further based on the encoding distance.

4. The method of claim 3, wherein generating the score further comprises:
   combining, using a first weight and a second weight learned by the machine learning model, a vector distance with the encoding distance, the vector distance in the plurality of vector distances.

5. The method of claim 4, wherein:
   the vector distance corresponds to a minimum distance of the plurality of vector distances; and
   the vector distance is between the first vector embedding and a vector embedding of the first plurality of vector embeddings that corresponds to the second token.

6. The method of claim 3, wherein the encoding distance is an edit distance between the first phonetic encoding and the second phonetic encoding.

7. The method of claim 3, wherein the first token is encoded using a phonetic coding algorithm.

8. The method of claim 1, further comprising:
   training the machine learning model using a plurality of utterances of a plurality of reliable channels.

9. The method of claim 1, further comprising:
   extracting, from the transcription, a second plurality of tokens of a second utterance of the reliable channel;
   generating, using the machine learning model, a second plurality of vector embeddings for the second plurality of tokens; and
   adding, before calculating the plurality of vector distances, the second plurality of vector embeddings to the first plurality of vector embeddings,
   wherein the utterance of the unreliable channel is interposed between the first utterance and the second utterance in the transcription.

10. A system for improving a transcription, comprising:
    a computer processor;
    a repository storing the transcription, wherein the transcription comprises a first plurality of tokens of a first utterance of a reliable channel and a first token of an utterance of an unreliable channel; and
    a transcription improver executing on the computer processor and configured to:
       identify, in the transcription, the first plurality of tokens and the first token,
       generate, using a machine learning model, a first vector embedding for the first token and a first plurality of vector embeddings for the first plurality of reliable channel tokens,
       calculate a plurality of vector distances between the first vector embedding and the first plurality of vector embeddings,
       generate, for the first token and using the plurality of vector distances, a score corresponding to a second token of the first plurality of tokens,
       determine the score is within a threshold score, and
       in response to determining that the score is within the threshold score, replace, in the transcription, the first token with the second token.

11. The system of claim 10, wherein the reliable channel corresponds to a value of a reliability metric that exceeds a reliability threshold, and wherein the unreliable channel corresponds to a value of an unreliability metric that exceeds an unreliability threshold.

12. The system of claim 10, further comprising a phonetics encoding engine executing on the computer processor and configured to:
    generate a first phonetic encoding of the first token and a second phonetic encoding of the second token, and
    calculate an encoding distance between the first phonetic encoding and the second phonetic encoding,
    wherein the transcription improver is further configured to generate the score based on the encoding distance.

13. The system of claim 12, wherein the reliable channel token corresponds to a vector distance of the plurality of vector distances, and wherein the transcription improver is further configured to generate the score by:
    combining, using weights learned by the machine learning model, the vector distance with the encoding distance.

14. The system of claim 12, wherein the encoding distance is an edit distance between the first phonetic encoding and the second phonetic encoding.

15. The system of claim 12, wherein the phonetics encoding engine is further configured to encode the unreliable channel token using a phonetic coding algorithm.

16. The system of claim 10, wherein the transcription improver is further configured to:
    train the machine learning model using a plurality of utterances of a plurality of reliable channels.

17. The system of claim 10, wherein the transcription improver is further configured to:
    extract, from the transcription, a second plurality of tokens of a second utterance of the reliable channel,
    generate, using the machine learning model, a second plurality of vector embeddings for the second plurality of tokens, and
    add, before calculating the plurality of vector distances, the second plurality of vector embeddings to the first plurality of vector embeddings,
    wherein the utterance of the unreliable channel is interposed between the first utterance and the second utterance in the transcription.

18. The system of claim 10, wherein the reliable channel matches an agent of a call center, and wherein the unreliable channel matches a customer of the call center.

19. A method for improving a transcription, comprising:
identifying, in the transcription, a first plurality of tokens of a preceding utterance of a reliable channel, a second plurality of tokens of an utterance of an unreliable channel, and a third plurality of tokens of a proceeding utterance of the reliable channel;
generating, for a first token of the second plurality of tokens and using a machine learning model, a plurality of alternative utterances each comprising a plurality of alternative tokens, wherein the first token corresponds to a score;
generating, using the machine learning model and for each respective alternative utterance in the plurality of alternative utterances:
a consequent probability that the respective alternative utterance follows the preceding utterance of the reliable channel, and
a precedent probability that the respective alternative utterance precedes the proceeding utterance of the reliable channel; and
substituting, based at least in part on the consequent probability, the precedent probability, and the score, an alternative utterance from the plurality of alternative utterances as a replacement for the utterance of the unreliable channel.

20. The method of claim 19, further comprising:
training, using a plurality of pairs of utterances, the machine learning model to predict whether a first utterance in a pair of the plurality of pairs is a consequent of a second utterance in the pair.

* * * * *